UNITED STATES PATENT OFFICE.

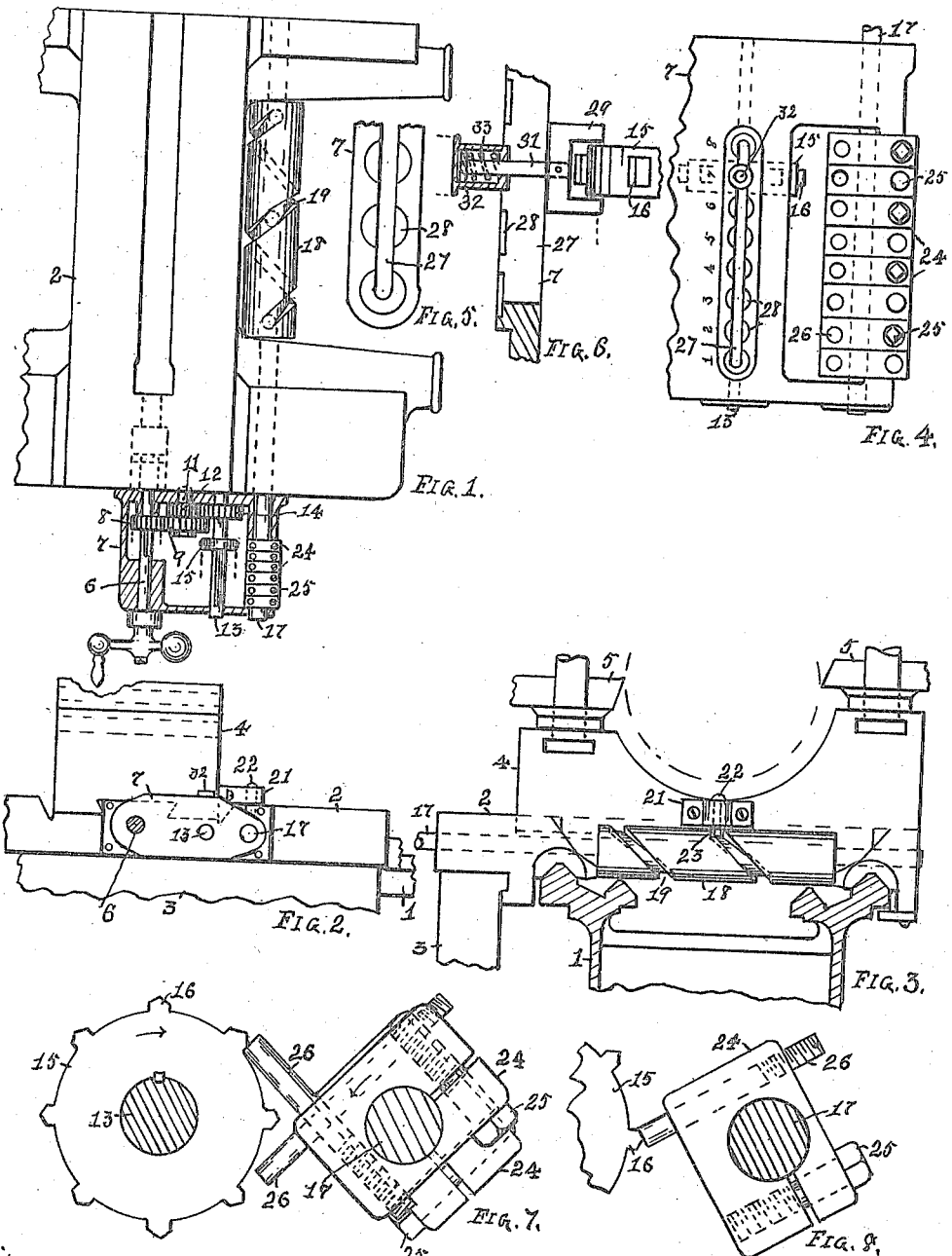

AUGUST M. SOSA, OF CINCINNATI, OHIO, ASSIGNOR TO THE AMERICAN TOOL WORKS COMPANY, OF CINCINNATI, OHIO, A CORPORATION OF WEST VIRGINIA.

MACHINE-TOOL.

1,248,941.  Specification of Letters Patent.  Patented Dec. 4, 1917.

Application filed June 16, 1917. Serial No. 175,188.

*To all whom it may concern:*

Be it known that I, AUGUST M. SOSA, a citizen of the United States, residing at Cincinnati, Ohio, have invented a new and useful Improvement in Machine - Tools, of which the following is a specification.

My invention relates to machine tools of the metal turning class, and the objects of my improvements are to provide a series of automatic stops for the cross head with the cutting tools in predetermined adjusted positions for duplicating in quantities the different diameters of successive sections of a given spindle; to provide the stops with micrometer adjustments for securing the required accuracy of the cutting position of the cutting tools; to provide means for selectively reversing the position of the stops to apply to the corresponding front and rear tool; to provide means for disconnecting the stop mechanism from its actuating connections that the machine tool may be used for other purposes, and to provide simple and durable construction and assemblage of the coacting members for securing facility of operation with accuracy, speed and efficiency of action. These objects together with others to be presented in the claims may be attained in the following described manner, as illustrated in the accompanying drawings, in which:

Figure 1 is a plan with parts in section of portions of an engine lathe embodying my improvements; Fig. 2 a front elevation of portions of the carriage and cross slide; Fig. 3 a rear side elevation of the carriage and cross slide showing the drum for actuating the cross slide stops; Fig. 4 an enlarged plan of the stop mechanism; Figs. 5 and 6 a plan and a vertical section respectively of details showing the mechanism for adjusting the splined disk on its shaft; Fig. 7 a front elevation of reversed superposed blocks in operative position in relation to the disk, and Fig. 8 a front elevation of portions of the stop mechanism in operative position for limiting the forward movement of the cross head with the rear cutting tool.

In the drawings, 1 represents portions of the bed of an engine lathe, 2 the carriage, 3 the apron depending therefrom, 4 the cross-slide provided with cutting tools 5 and slidably adjustable on the carriage by means of the cross-feed screw 6, all being constructed and arranged in the ordinary manner.

The screw 6 is journaled in the casing 7 which is secured on the front end of the carriage and the pinion 8 splined thereon engages with the gear 9 which is loose on the fixed stud 11. The smaller gear 12 loose on said stud is arranged to turn in unison with gear 9 and the shaft 13 journaled in the casing 7 is provided with the gear 14 in engagement therewith. The disk 15 splined on said shaft is formed with a series of peripheral lugs 16. The shaft 17 journaled in the rear side of the carriage and in the front wall of the casing is provided with the drum or cylinder 18 parallel with the cross-slide and which is formed with the high pitch helical groove 19 in its face.

The bracket 21 removably secured on the cross-slide forms a bearing wherein the pin 22 is journaled and which pin may be formed either with an enlarged cylindrical head or provided with a loose anti-friction roller 23 in continuous movable engagement with the groove in the drum, for rotatively adjusting the drum with its shaft 17 by the movement of the cross-slide under the action of the feed screw.

A series of clamp blocks 24 superposed on shaft 17 may be independently adjusted thereon to any desired rotative position and secured by means of the corresponding clamping screws 25. Stop pins 26 adjustably threaded in the respective blocks 24 project with their blank ends therefrom in a direction parallel with the tangent of the shaft 17 for engaging with one of the lugs 16 on the disk 15, as shown in Fig. 7, to limit the rearward movement of the cross-slide with the front cutting tool in predetermined operative position.

For limiting the forward movement of the cross-slide with the rear cutting tool in desired position, the blocks 24 may be selectively placed on the shaft 17 with the pins 26 projecting with their blank heads in the opposite direction for engaging with the corresponding lug 16 on the disk 15, as shown in Fig. 8. The blocks shown in Fig. 2 are placed alternately in rearward position on the drum shaft.

The top of the casing is formed with a slot 27 directly over the shaft 13 and with recessed seats 28 directly opposite the corresponding blocks 24. The shifting yoke 29 for the disk 15 is provided with the shank 31 which extends through the slot and is provided with the spring actuated cap 32 which serves to move the yoke with the disk longitudinally on the shaft 13 into selective registration with the blocks 24 where it may be maintained by the automatic engagement of the cap under the exertion of the spring 33 with the corresponding seat 28.

In operation, a finished master spindle may be centered in the lathe in the ordinary manner. The cross-head may then be adjusted by means of the feed screw with the front cutting tool in the proper position to make the finishing cut for the desired size of the first section of the spindle adjacent to the tail stock. The action of the cross feed screw in effecting this adjustment is communicated through the intervening gears to turn the disk shaft with the splined disk thereon to a predetermined rotative position. The splined disk may then be moved longitudinally on its shaft into registration with the block on the drum shaft which corresponds with the first section of the spindle. The block may then be rotatively adjusted with the stop pin therein to contact with the corresponding lug on the disk and securely clamped in adjusted position on its shaft by means of its clamping screw.

The stop pin, being adjustably threaded in the block, provides a micrometer adjustment for the contact of its end with the lug on the disk after the block is secured on its shaft. In a similar manner the adjacent block and stop pin may be adjusted for the rear cutting tool to the size of the adjacent section of the spindle, having first shifted the disk into registration with said block. In like manner the successive blocks with the stop pins, and the disk may be adjusted to limit the movement of the cross slide with the cutting tools to the proper size of the successive sections of the master spindle.

The movement of the cross slide actuates the anti-friction roller in the helical groove to turn the drum with the stop pins into contact with the corresponding lug on the disk as previously adjusted and in registration with the desired block. The seats in the casing for the yoke cap may be numbered, as shown in Fig. 2, to indicate the position of the disk to engage the stop pin corresponding to the different sections of the master spindle. The use of this device prevents the careless operator from injuring the stock by a wrong adjustment of the cutting tool and permits of more rapid and accurate duplication of work for which it may be adapted.

The action of the stop mechanism may be discontinued when it is desired to use the machine for other purposes, by sliding the splined gear on the cross-feed screw out of engagement with its corresponding gear on the stud and by removing the bearing from the cross-head with the anti-friction roller out of engagement with the helical groove in the drum.

Having fully described my improvements, what I claim as my invention and desire to secure by Letters Patent of the United States is:

1. In a machine tool the combination of a tool carrier, a feed screw therefor, a rotatively adjustable stop, a co-acting stop, and respective actuating connections from the carrier and from the screw for turning said stops into mutual engagement, whereby the movement of the carrier in either of opposite directions may be limited.

2. In a machine tool a stop mechanism for the tool carrier comprising relatively adjustable coacting stops, and automatic means for turning said stops simultaneously and into mutual engagement.

3. In a machine tool a stop mechanism for the tool carrier comprising a series of independently adjustable stops, means actuated by the movement of the carrier for turning the stops in unison, a coacting rotative stop, selective means for moving and maintaining said stop in registration with either stop of the series, an adjusting screw for the carrier, and actuating connections therefrom with the latter stop.

4. In a machine tool the combination with a carriage, a cross-slide thereon and a feed screw for the slide, of a shaft provided with a drum formed with a helical groove, connections from the slide with the groove for turning the drum with its shaft, a series of tangential stops rotatively adjustable on the shaft, a coöperating stop movable into selective registration with the stops of the series, and gear connections with the feed screw for rotating the latter stop whereby the slide may be limited to predetermined points in its movement.

5. In a machine tool a series of rotatively adjustable stops, automatic means for rotatively adjusting said stops in unison, a coacting stop, means for selectively adjusting it into registration with either stop of the series, and automatic means for turning the latter stop at a different ratio of speed to intercept the corresponding stop of the series at a predetermined point in its rotative movement.

6. In a machine tool a stop mechanism comprising a series of rotatively adjustable stops, a coacting rotative stop movable into selective registration with the stops of the series, and separate connections for rotating the series of stops in unison and the latter stop at a different speed and into engagement with the corresponding stop of the series at a predetermined point in their movement.

7. In a machine tool a stop mechanism for the tool carrier comprising a series of separately adjustable stops, connections from said carrier for rotating said stops in unison, a coacting stop, means for selectively moving said latter stop into the path of the stops of the series, and connections from the feed screw of the carrier for turning the latter stop into engagement with the corresponding stop of the series at a predetermined point in their movement.

8. In a machine tool a stop mechanism for the tool carrier comprising coacting rotative stops, separate actuating connections for moving said stops at different ratios of speed in relation to the movement of the carrier and into engagement with each other at a predetermined point in their movement.

9. In a machine tool a tool carrier, an adjusting screw therefor, a stop mechanism for the carrier comprising a shaft formed with a helical groove, a member movably engaging with the groove and removably secured to the carrier, a series of blocks rotatively adjustable on the shaft, tangential stop pins adjustably threaded in the blocks, a second shaft, a disk splined thereon and formed with peripheral lugs, means for selectively moving and maintaining said disk in registration with the blocks, and detachable gear connections from the screw for turning the latter shaft and the stop with one of the lugs thereon into engagement with the corresponding stop pin for preventing the movement of the carrier in either of opposite directions beyond a predetermined point.

10. In a machine tool the combination with a carriage, a cross-slide, an adjusting screw therefor, of coacting adjustable stops, separate detachable connections from the cross-slide and also from the screw for rotatively actuating the respective stops at a different ratio of speed and into engagement for preventing the movement of the slide beyond a predetermined point.

11. The combination with a tool carrier and its feed screw, of relatively adjustable coacting stops, and connections therewith from the respective carrier and screw for turning said stops simultaneously and into mutual engagement.

12. A stop mechanism for a tool carrier, comprising relatively adjustable coacting stops, and automatic means for rotating them at relatively different speeds and into mutual engagement at predetermined points in their rotation.

13. In combination with a tool carrier and its feed screw, of a series of relatively adjustable stops, a stop adapted to be adjustably secured in registration with either of the stops of the series, and connections from the carrier and the screw for automatically rotating the respective series of stops and the separate coacting stop at relatively different speeds with the registering stops into mutual engagement.

A. M. SOSA.

Witnesses:
R. S. CARR,
E. R. GROSSMAN.